Oct. 15, 1968  F. E. STUART, SR  3,405,872
WASHER AGITATOR FOR FILTER BEDS
Filed Aug. 17, 1966
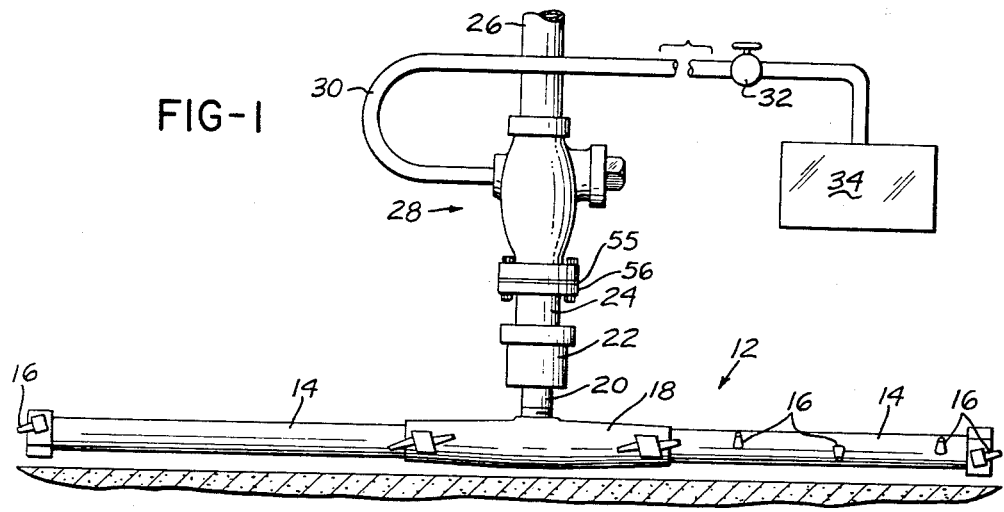
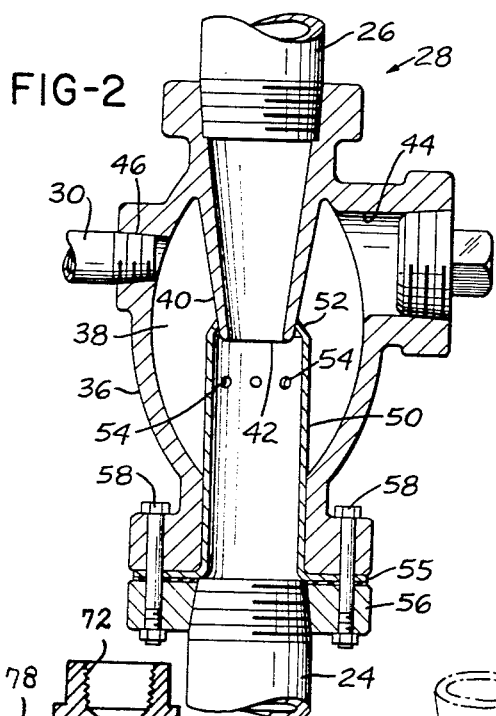
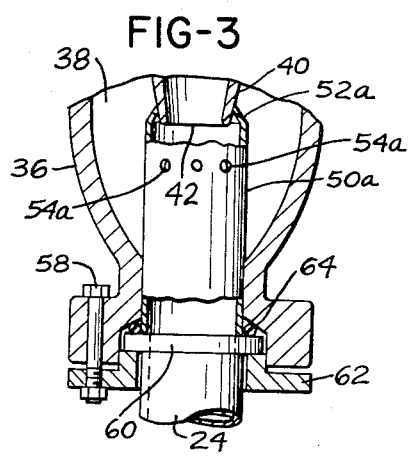
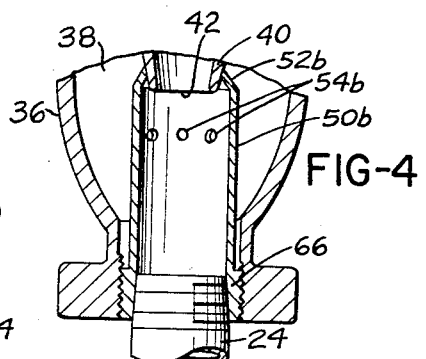
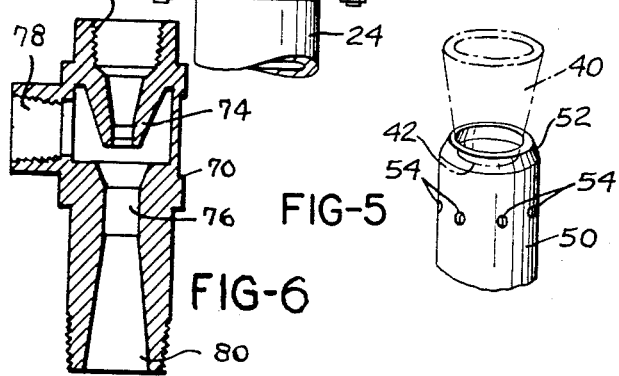
INVENTOR.
FRED E. STUART Sr.
BY United States Patent Office 3,405,872
Patented Oct. 15, 1968

3,405,872
WASHER AGITATOR FOR FILTER BEDS
Fred E. Stuart, Sr., 523 N. Grandview Ave.,
Daytona Beach, Fla. 32018
Filed Aug. 17, 1966, Ser. No. 573,044
6 Claims. (Cl. 239—254)

ABSTRACT OF THE DISCLOSURE

Rotary agitator arrangement for filter beds in which a supply of water under pressure is delivered to the agitator to cause rotation of the agitator while jets of water emerge from the agitator to scour the material of the filter bed and; wherein, the supply pipe leading to the agitator is provided with an aspirator having a suction port which is connected to a source of treatment liquid whereby simultaneously with the supply of the first mentioned fluid to the agitator there is also a controlled supply of treatment liquid to the agitator.

---

This invention relates to a method and apparatus for washing filter beds and is particularly concerned with such a method and apparatus employing a rotary filter bed agitator.

Filter beds of the nature with which the present invention is adapted for use comprise a body or bed of granulated material commencing at the top with relatively fine sand-like material and increasing in coarseness downwardly through the bed. When liquid to be filtered, such as water, is passed downwardly through such a bed the soil therein is picked up by the filter bed, particularly in the region at the top thereof so that only clean liquid flows out from the bottom of the filter bed. Periodically, such a filter bed must be cleaned and this is done by passing liquid in reverse flow upwardly through the filter bed to dislodge the soil therefrom and overflowing the liquid and entrained soil into overflow troughs to a drain.

It is furthermore, advantageous when backwashing such a filter bed in the manner described, to additionally agitate and scour the fine particles of the filter bed at the top. This can be accomplished by rotary agitators which are in the form of pipes having nozzles thereon to project jets into the material of the filter bed and thereby agitate and scour the material and thus dislodge soil therefrom which is floated off with the backwash water.

Such agitator members generally rest just above the upper surface of the bed when the bed is in filtering operation and, when the bed is backwashed and the upper level thereof is elevated somewhat by the backwash liquid, the agitator is disposed beneath the uppermost surface of the filter bed and is thus highly effective for agitating and scouring the material of the filter bed.

Many times the foreign matter filtered out from the liquid is of such a nature that it would be of advantage to be able to treat the filter bed chemically or to supply oxygen or air thereto during the backwashing and scouring of the filter bed.

The present invention proposes the provision of a method and apparatus for effecting such added treatment of material in the filter bed during the backwashing and scouring thereof.

The present invention has as its primary object the provision of a method and apparatus which is automatically operable, during the operation of a filter bed agitator, for supplying treatment fluid thereto in measured amounts for treatment of the material of the filter bed.

Another object of the present invention is the provision of an apparatus for causing treatment liquid to be entrained in the scouring water supplied to a filter bed agitator and which is relatively simple and inexpensive and free of trouble in operation.

A still further object of this invention is the provision of an apparatus of the nature referred to which can be made selectively operable and inoperable without in any way influencing the operation of the filter bed agitator.

The foregoing objects as well as still other objects and advantages of the present invention will become more apparent upon reference to the following specification taken in connection with the accompanying drawings in which:

FIGURE 1 is a rather schematic showing of a filter bed agitator and a portion of a filter bed with the agitator provided with a device according to the present invention and adapted for operation in accordance with the method of the present invention;

FIGURE 2 is a vertical sectional view drawn at somewhat enlarged scale of an aspirator forming a part of the agitator assembly of FIGURE 1;

FIGURE 3 is a view like FIGURE 2 but shows a modified manner in which the aspirator can be formed;

FIGURE 4 shows still another manner of making the aspirator;

FIGURE 5 is a fragmentary perspective view showing an important element provided in the aspirator in accordance with the teachings of the present invention; and FIGURE 6 is a section showing another type of inductor that can be used.

Referring to the drawings somewhat more in detail, reference numeral 10 indicates a filter bed, at least the upper portion of which is relatively fine granular material. This filter bed is confined within a container according to conventional practices and, in the normal course of events, liquid, such as water, will flow downwardly therethrough and be filtered through the filter bed. Periodically, when it is decided to clean the filter bed, liquid, such as water, is passed upwardly through the filter bed to dislodge soil therefrom and this backwashing liquid, together with the entrained soil, is flowed off through suitable overflow channels to drain. During the backwashing, the upper level of the filter bed lifts and extends to above the level of the filter bed agitator generally indicated at 12. This agitator, per se, is of a substantially conventional nature and comprises the horizontally extending pipes 14 which are provided with nozzles 16 distributed thereover so as to provide thorough agitation of the filter bed material in the region of the agitator while at the same time being so disposed on the opposite sides of the center of the agitator as to cause the agitator to rotate continuously whenever it is supplied with water under pressure.

In the center of the agitator is a T fitting 18 to which the pipes 14 are connected. T fitting 18 has a vertical pipe 20 extending therefrom which is rotatably supported in a bearing 22. From the top of bearing 22 there extends a pipe 24. Pipe 24 is adapted for receiving water under pressure from a supply pipe 26 via an aspirator unit generally indicated at 28 and forming an important part of the present invention.

Aspirator unit 28 is adapted, whenever water under pressure is being supplied from conduit 26 to conduit 24, to develop a suction on conduit or tube 30 leading from the aspirator through the control valve 32 to a supply of treatment fluid at 34. Treatment fluid is continuously drawn through conduit 30 from the source 34 thereof and injected into the liquid means supplied to the agitator whenever the valve 32 is open while the agitator is in operation. Upon stopping operation of the agitator, or upon closing valve 32, the supply of treatment liquid is interrupted.

It is to be understood that this treatment liquid could comprise a liquid detergent or a liquid germicide or the like or could even constitute air or oxygen, if so desired, or could consist of part air or oxygen and part detergent. The suction developed in the inductor will permit the drawing in of any one or several fluid agents.

Turning now to FIGURE 2, it will be seen that the aspirator 28 is adapted for being connected with conduit 26 at the top and with conduit 24 at the bottom. The aspirator comprises a body 36 having a cavity 38 therein. Extending from the upper end of the aspirator a substantial distance along the cavity 38 is the inwardly tapering conical element 40 which, its larger end receives the entire flow from conduit 26. As is known in the art of fluid mechanics, a supply of water through conduit 26 under pressure will result in the discharge of a jet of water from the lower open end 42 of member 40 and at such a pressure that suction will be developed within the chamber 38.

Chamber or cavity 38 is provided with an enlarged clean out opening 44 on one side of body 36 and with a smaller opening 46 on the other side to which tube or conduit 30 is connected. When water under pressure is passing from conduit 26 into the aspirator and flowing therefrom through conduit 24 to the agitator, conduit 30 will be under suction and treatment liquid can be drawn into the cavity or chamber 38 and thus entrained in the liquid passing through the aspirator.

A particular feature of the present invention is to be found in the member 50 which is mounted in the lower portion of the aspirator body and which is in the form of a tube communicating at its lower end with conduit 24 and at its upper end being formed inwardly as at 52 and engaging the outer periphery of the nozzle element 40. Provided in the side wall of member 50, a short distance below the exit end of nozzle member 40 is a series of circumferentially distributed apertures or holes 54 through which the treatment liquid is drawn from chamber or cavity 38 into the interior of member 50. In this manner a controlled flow of the treatment liquid is obtained while at the same time the treatment liquid is uniformly distributed about the entire cross section of the stream of liquid flowing from conduit 26 to conduit 24 and thus becomes intimately admixed therewith and is, accordingly, uniformly distributed thereout the portion of the filter bed influenced by the agitator.

More specifically, in an aspirator having a two inch supply line at the top, the aspirator might be on the order of ten inches long and the apertures 54 might be about three sixteenths of an inch in diameter and disposed three quarters of an inch below the end of the nozzle. Eight holes of this size are usually adequate. The conduit 30 under the circumstances referred to would be on the order of about a half inch in diameter.

I have found that by the practice of the present invention, highly effective additional treatment can be given that portion of the filter bed which is normally influenced by an agitator of the nature referred to. For example, as mentioned, chemical treatments of various natures can be given the bed and, also, air or oxygen can be supplied to the material of the filter bed to beneficial end results.

In FIGURE 2 member 50 has a flange at 55 and is secured to the lower end of body 36 by flange 56 which is secured to said body by bolts 58. Flange 56 is bored and threaded to receive pipe 24.

In FIGURE 3, the member corresponding to member 50, and which is indicated at 50a, is made integral with pipe 24, as by welding it to the end thereof and the pipe is provided with a flange or collar 60. The pipe is held in place by a clamping flange 62 and is sealed to the body by seal means 64.

In FIGURE 4 member 50b, which corresponds to member 50 in FIGURE 2 and member 50a in FIGURE 3, is integral with or is secured to a bushing 66 threaded into the lower end of the body 36b of the aspirator and which receives the upper end of pipe 24. The arrangement of FIGURE 4 permits the use of a conventional aspirator of the usual type whereas the modification of FIGURES 2 and 3 have the lower end portion of the aspirator body slightly modified from that of a conventional aspirator body.

FIGURE 6 shows an inductor of another, and somewhat similar type having a body 70 with a pressure inlet 72 for connection to the supply pipe. Nozzle 74 supplies a jet of inlet liquid to the throat of venturi 76, picking up air or oxygen or liquid, or a combination thereof, at suction port 78. The mixture discharges from discharge port 80.

The arrangement of the nozzles in the agitator is important. Some of the nozzles are set in the agitator pipe just above the center and point upwardly at an angle of 15° to the horizontal while others are set in the pipe just below the center and point downwardly at an angle of 15° to the horizontal.

The upwardly directed nozzles will discharge the gas-liquid mixture better than the downwardly directed nozzles.

It will be understood that this invention is susceptible to modification in order to adapt it to different usages and conditions; and accordingly, it is desired to comprehend such modifications within this invention as may fall within the scope of the appended claims.

What is claimed is:

1. In combination; a rotary agitator for a filter bed, a supply pipe leading to said agitator, an aspirator in said supply pipe having a suction port, a source of treatment fluid, and a conduit connected to said suction port and leading to said source of treatment fluid, said aspirator having an inlet port connected to the portion of the supply pipe leading to the aspirator and a discharge port connected to the portion of the supply pipe leading from the aspirator to the agitator, a nozzle in the aspirator having its inlet end connected to said inlet port and tapering inwardly toward said outlet port and terminating short of said outlet port, a cylindrical member in said aspirator having one end connected to said outlet port and extending toward said nozzle and sealingly engaging the said nozzle on the outside near the discharge end thereof, said cylindrical member having apertures therein distributed about the circumference thereof and located therein slightly downstream from the discharge end of said nozzle, and said suction port communicating with the space in the aspirator which surrounds said nozzle and said cylindrical member.

2. A rotary agitator according to claim 1 in which said cylindrical member has a flange at the end opposite the nozzle end thereof, and a clamp ring clamping said flange to the adjacent end of the aspirator, the portion of the supply pipe leading from the aspirator to the agitator being connected to said clamp ring.

3. A rotary agitator according to claim 1 in which said cylindrical member is fixed to the end of the portion of the supply pipe leading from the aspirator to the agitator, and means for connecting said portion of the supply pipe to said aspirator.

4. A rotary agitator according to claim 1 in which said cylindrical member has a bushing on the end opposite the nozzle end thereof, said bushing threading into the adjacent end of the aspirator and threadedly receiving the aspirator end of the portion of the supply pipe leading from the aspirator to the agitator.

5. A rotary agitator according to claim 1 in which said rotary agitator comprises horizontal pipe means, and discharge nozzles distributed along said pipe means, some of said discharge nozzles being inclined upwardly and others thereof being inclined downwardly.

6. A rotary agitator according to claim 5 in which the angle of inclination to the horizontal of the inclined ones of said discharge nozzles is about 15°.

References Cited

UNITED STATES PATENTS

| | | | |
|---|---|---|---|
| 1,967,909 | 7/1934 | Sonner | 239—318 |
| 2,381,589 | 8/1945 | Hayes | 239—318 |
| 2,621,795 | 12/1952 | Armbrust | 222—193 |
| 2,769,547 | 11/1956 | Hirsch | 239—254 |
| 2,785,012 | 3/1957 | Frewin | 239—318 |
| 3,018,058 | 1/1962 | Koller | 239—318 |
| 3,235,134 | 2/1966 | Frye | 222—193 |
| 3,343,727 | 9/1967 | Ohlin | 222—193 |

FOREIGN PATENTS 16,381  7/1914  Great Britain.

WALTER SOBIN, *Primary Examiner.*